United States Patent
Fruchtman et al.

(10) Patent No.: US 6,233,612 B1
(45) Date of Patent: May 15, 2001

(54) DYNAMIC NETWORK PROTOCOL MANAGEMENT INFORMATION BASE OPTIONS

(75) Inventors: Barry Fruchtman; Michael Allen Kaczmarski; Donald Paul Warren, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/143,977

(22) Filed: Aug. 31, 1998

(51) Int. Cl.[7] .................................................. G06F 15/173
(52) U.S. Cl. ............................................ 709/223; 709/224
(58) Field of Search ..................................... 709/223, 224

(56) References Cited

U.S. PATENT DOCUMENTS

| | | |
|---|---|---|
| 5,483,468 | 1/1996 | Chen et al. . |
| 5,491,796 | 2/1996 | Wanderer et al. . |
| 5,506,955 | 4/1996 | Chen et al. . |
| 5,561,769 | 10/1996 | Kumar et al. . |
| 5,634,009 | 5/1997 | Iddon et al. . |
| 5,651,006 | 7/1997 | Fujino et al. . |
| 5,724,516 | 3/1998 | Temoshenko . |
| 5,729,688 * | 3/1998 | Kim et al. ............................ 709/226 |
| 5,787,248 * | 7/1998 | Zupcsics et al. ..................... 709/230 |
| 5,961,595 * | 10/1999 | Kawagoe et al. .................... 709/223 |
| 5,991,828 * | 11/1999 | Horie et al. ............................. 710/8 |
| 6,012,152 * | 1/2000 | Douik et al. ........................... 714/26 |
| 6,138,154 * | 10/2000 | Karino ................................. 709/223 |

* cited by examiner

Primary Examiner—Krisna Lim
(74) Attorney, Agent, or Firm—John H. Holcombe; Robert M. Sullivan

(57) ABSTRACT

Disclosed is a method, embodiable in computer readable program code in a network resource, for dynamically changing a network protocol management information base (MIB) module, the protocol requiring predetermined fixed fields in the MIB module. The method comprises inserting a variable in one of the predetermined fixed fields in the MIB module, and providing a first path for dynamically setting a reference to a script which substitutes for the variable, the referenced script defining a user option for operating the network resource. The referenced script operation may sense a value related to the network resource. A second path is provided to the script reference, whereby a query on the second path activates the script operation to provide the value at the MIB, and the provided value is delivered on the second path. The referenced script operation may additionally comprise conducting an operation of the network resource, and the value relates to the operation of the network resource. The second path provided to the script reference allows a query on the second path to activate the script operation and to provide the value at the MIB.

27 Claims, 3 Drawing Sheets

DYNAMIC NETWORK PROTOCOL MANAGEMENT INFORMATION BASE OPTIONS

TECHNICAL FIELD

This invention relates to network management, and, more particularly, to network management where the protocol for the management information base (MIB) requires fields which, once established, are fixed.

BACKGROUND OF THE INVENTION

Computers and associated devices or systems, such as storage subsystems, are commonly arranged into networks to allow intercommunication. Often, such networks must accommodate a vast number of such computers, for example, varying from small personal computer systems and workstations to large data processing host systems. The specific computers and devices are subject to arbitrary change, for example, as newer computer systems become available.

As the result, the management of the network is very complex. In order to perform network management, network management tools employing software applications have been developed. For example, developers would provide a network manager that may periodically poll devices, called network "nodes", connected to the network to determine the systems or devices and their operability. This approach is often called the "ping" approach, and required specific response characteristics between the node and the network manager.

The developments also were directed at managing traffic and error conditions on the network and other issues. To accommodate the various network managers, standards, such as SNMP (Simple Network Management Protocol) were developed to facilitate development among different network management suppliers. SNMP outlines particular protocol for data that may be gathered, allowing developers to write their applications, knowing that any device or system which complies with the standard will provide the data in accordance with the protocol.

In SNMP, the data is provided in a management information base ("MIB"), which is a data structure in a network management application in the network resource. The MIB has fields that, once established, are fixed. For example, in an exemplary application, certain groups of data are provided: Node ID, Statistics, History, Alarm, Packet Capture, and Events. This data may be queried by the network manager, requesting specific data from specific fields of the MIB. In order to accommodate high speed access and response by the node device, the node MIBs are dedicated, often with fixed specific code.

In a typical major data processing system, a number of "client" data processors are coupled to one or more storage management servers over a network, and the server receives data files from the clients and stores them on several attached storage devices. The storage management server manages the back-up, archival, and migration of the client files. The user of the network manager thus may wish to receive information relating to the operation of the server, and may wish to change the information received from the server on a dynamic basis.

For example, the quantities of data stored in the storage server, the types of stored data, and the media on which the data are stored, the number of clients logged on (sessions), and the rates of back-up, archiving, and migration of the files are subject to variability, and the network user may wish to understand particular aspects of the storage management server not contemplated as sufficiently important to include in the received information by the network management developer.

SUMARY OF THE INVENTION

It is therefore an object of the present invention to provide a vehicle for the user of the network manager to optionally modify the received information of the network manager, while remaining within the confines of a fixed, standard network protocol.

Disclosed are a method, a system, an article of manufacture comprising a computer readable medium having computer readable program code embodied therein, and a computer program product for dynamically changing a network protocol management information base (MIB) module of a server or other network resource, the protocol requiring predetermined fixed fields in the MIB module. The method comprises inserting a variable in one of the predetermined fixed fields in the MIB module, and providing a first path for dynamically setting a reference to a script and any associated parameter, the script reference substituting for the variable at the one predetermined fixed field in the MIB module. The referenced script defines a user option for operating the server or network resource.

The referenced script operation may sense a value related to the network resource, and in an additional step, a second path is provided to the script reference, whereby a query on the second path activates the script operation to provide the queried value. In a further step, the capability is provided to deliver the value to the querying network manager.

In another aspect of the present invention, the referenced script operation may additionally comprise conducting an operation of the network resource, and the value relates to the operation of the network resource. The second path provided to the script reference allows a query on the second path to activate the script operation and to provide the value at the MIB and to the network manager.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
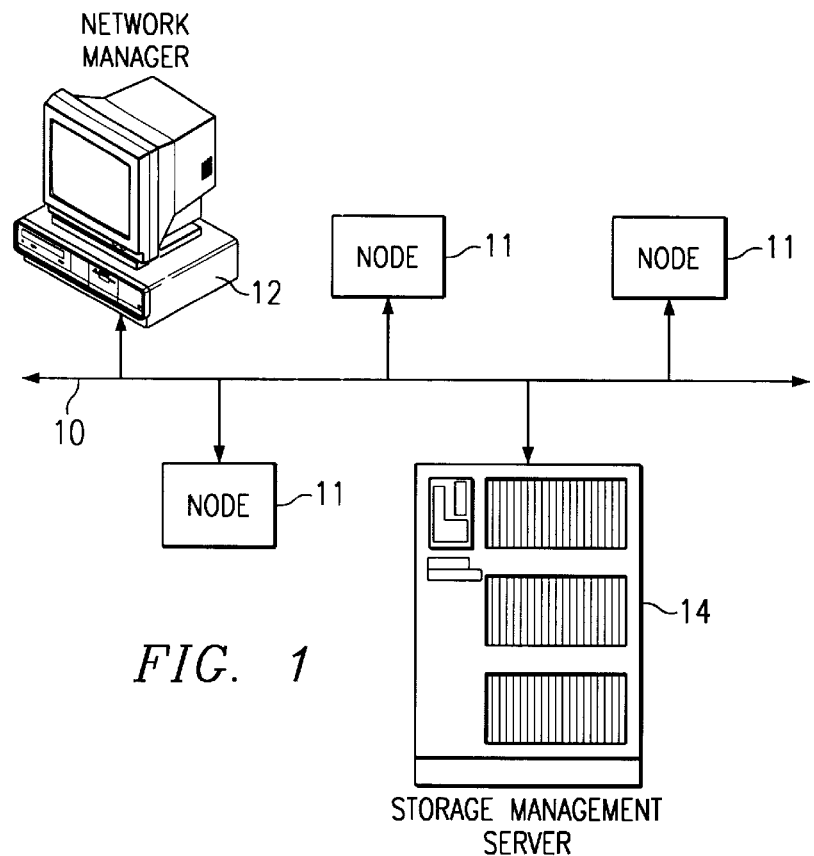
FIG. 1 is a diagrammatic representation of a segment of a network incorporating a network manager and a storage management server in accordance with one embodiment of the present invention.

Referring to FIG. 1, a segment of a computer network is illustrated. The computer network comprises an infrastructure 10 interconnecting various network nodes 11. The infrastructure 10 comprises any suitable digital communication system, and may involve satellites, fiber optic, cable or wire communications media, or any combination.

The function of such networks is to interconnect, typically, a vast number of computers and associated network resources. For example, such computers may vary from small personal computer systems and workstations to large data processing host systems. The specific computers and network resources are subject to arbitrary change, for example, as newer computer systems become available. As the network is very complex, a network manager 12 is provided to manage the operation of network.

Examples of network managers 12 may include an Enterprise Application Manager, such as that provided by Tivoli, an IBM subsidiary, a conventional Simple Network Management Protocol (SNMP) manager, and a "Netview" manager application. Each of the network managers 12 conventionally comprises a software application running on a computer processor.

Data processing systems typically require storage of large amounts of data, which data is continually being updated, added to, deleted or changed. In major data processing systems, this data is stored by storage management servers 14 which are coupled to the network infrastructure 10. A number of "client" data processors, each at one of nodes 11, are coupled to a storage management server 14 over the network 10, and the server receives data files from the clients and stores them on several attached storage devices 15 such as disk drives, RAID systems, tape drives, optical drives, and/or tape or optical libraries. The storage management server manages the back-up, archiving, and migration of the client files.

Figure 2:
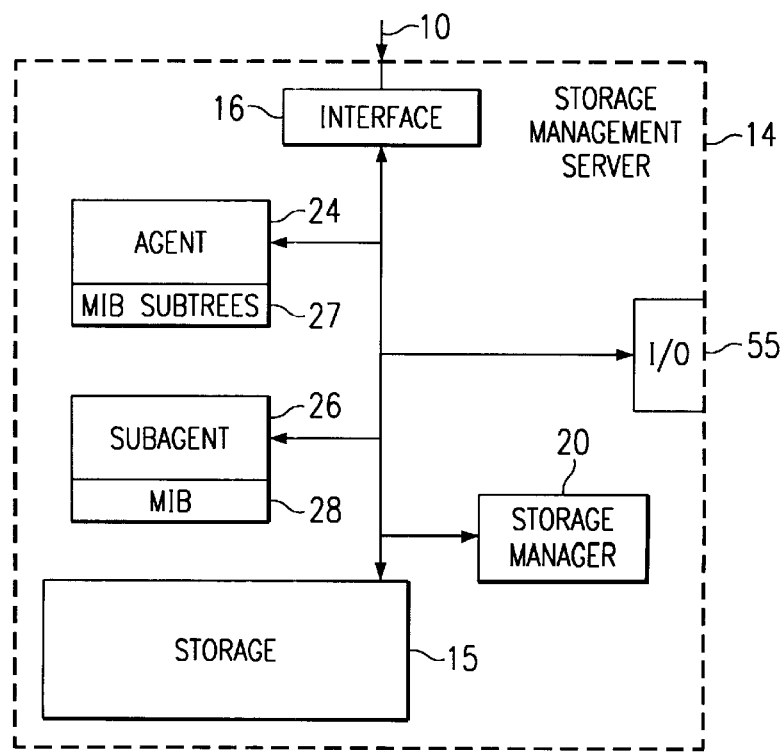
FIG. 2 is a block diagram of an embodiment of a storage management server of FIG. 1, including a MIB in accordance with the present invention.

Referring to FIG. 2, a storage management server 14 is shown which is coupled to the network infrastructure 10 at an interface 16. The storage management server 14 includes a storage manager 20 which comprises a computer processor that is operated in accordance with one or more computer program products running on the processor's operating system. One example of a storage manager 20 is an IBM RS/6000 computer processor running the IBM ADSTAR Distributed Storage Manager (ADSM). Other examples of storage managers include MVS mainframes, UNIX processors, or Windows NT systems running with appropriate computer program products.

As discussed above, referring to FIGS. 1 and 2, the network manager 12 manages the network using a standard protocol, such as SNMP (Simple Network Management Protocol). SNMP outlines a particular protocol for data that may be gathered, allowing developers to write their applications, knowing that any device or network resource which complies with the standard will provide the data in accordance with the protocol.

The SNMP protocol traditionally requires fixed information fields in the MIB which are maintained with custom programming in an SNMP Agent 24 and SNMP Subagent 26. As is understood by those of skill in the art, the SNMP Agent is a program module with limited capability and has limited addressing capability. Thus, an SNMP Agent 24 is often employed for initial addressing and has MIB subtrees 27 for directing the addressing of a MIB, and an SNMP Subagent 26 is employed for the actual MIB 28 for the particular network resource. In the conventional SNMP, the data is provided at the management information base which has fields that, once established, are fixed. The fields are thus preprogrammed and have an object or variable at which the desired data is stored. For example, in an exemplary application, certain groups of data are provided: Node ID, Statistics, History, Alarm, Packet Capture, and Events. The network manager 12 will address the desired MIB in a query, requesting specific data by requesting the specific fields of the MIB.

As discussed above, the user of the network manager 12 may optionally wish to receive information relating to the operation of the server 14 or other network resource which is different from that designed by the developer of the SNMP MIB, and may wish to optionally change the information received from the server on a dynamic basis. For example, the quantities of data stored in the storage server, the types of stored data, and the media on which the data are stored, and the rates of back-up, archiving, and migration of the files are subject to variability, and the network user may wish to understand particular aspects of the storage management server not contemplated as sufficiently important to include in the received information by the network management developer.

One of skill in the art will recognize that an administrator or network user of a network may also require dynamically changeable MIB information for other types of network resources attached to the network.

Figure 3:
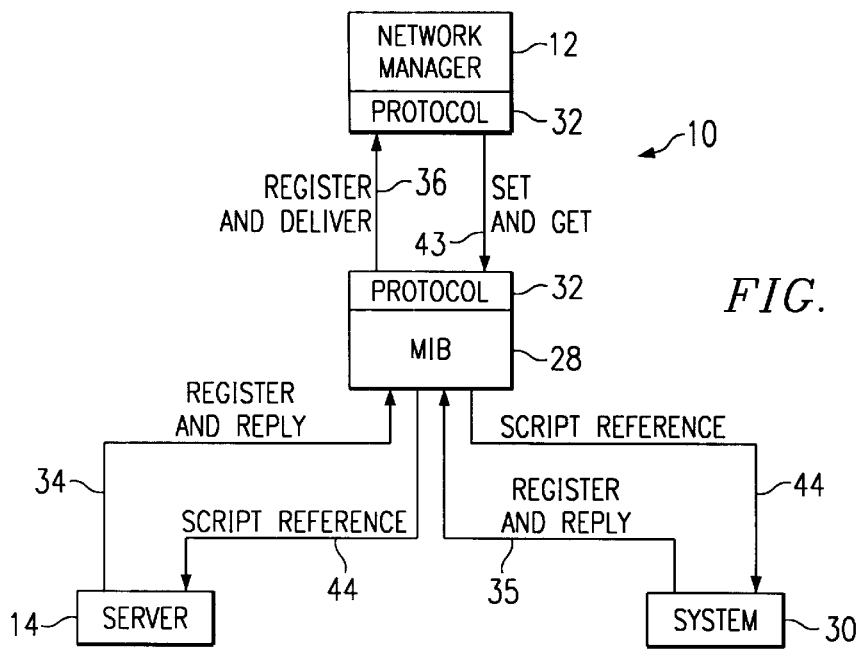
FIG. 3 is a block diagram of an embodiment of a network manager, a MIB and servers in accordance with the present invention.
Figure 4:
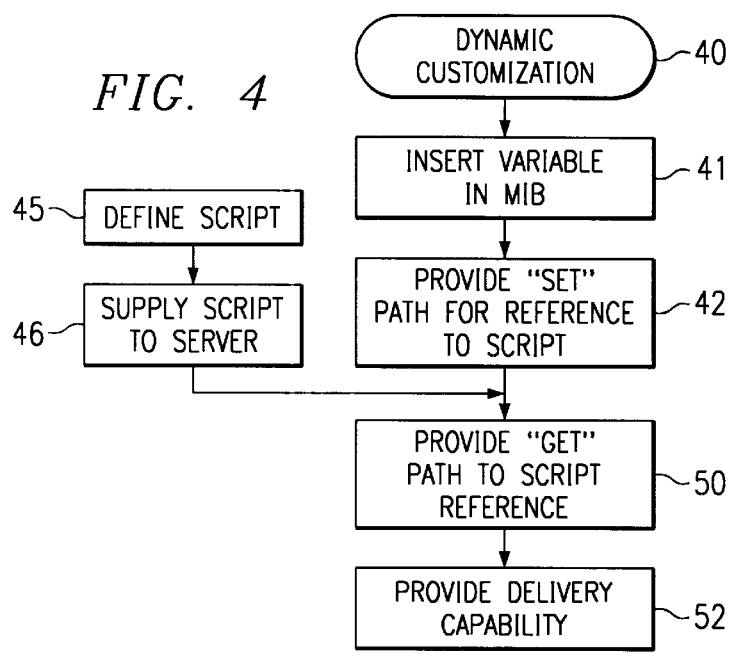
FIG. 4 is a flow chart depicting an embodiment of the method of the present invention.

Referring to FIGS. 3 and 4, embodiments of a method and system are illustrated in accordance with the present invention for dynamically changing a network protocol management information base (MIB) module 28 of a server 14, or other system or device 30, in a network. One of skill in the art will recognize that the present invention is equally applicable to a storage management server, another type of server, other system or device or other network resource, and that, hereinafter, the terminologies thereof may be interchanged.

In FIG. 3, the network manager 12 is illustrated as coupled to the management information base (MIB) module 28 through the network infrastructure 10 employing a standard protocol 32, such as SNMP. The MIB 28 may comprise the MIB of an Agent or of a Subagent. The Agent or Subagent, or both, may be resident in the server 14, the system 30, or in an attached processor or microprocessor.

In accordance with standard protocols, the Agent or Subagent, and the server or system, register with the network, typically with the network manager 12. The registration sets up the appropriate addresses for implementing the network communication therewith. The registration process of server 14 is illustrated as taking place on path 34, the registration of system 30 on path 35, and the registration of the Agent for the MIB 28 on path 36. The network manager 12 gains access to the pre-defined MIB 28 upon registration. When the server 14 or system 30 register with the network, additional references in the MIB are added referring thereto.

Referring additionally to FIG. 4, the method of providing dynamic customization is initiated 40 and comprises inserting 41 a variable in one of the predetermined fixed fields in the MIB module 28. An operation within the SNMP protocol is the "SET" function, which sets the value of an addressed variable in the MIB. For example, this function may enable a network device for operation, or set a packet size for a router.

In one embodiment, the present invention, in step 42, establishes this "SET" function as a means of providing a first path, depicted as lines 43 and 44, for allowing the user to dynamically set a reference to a script and any associated parameter, the script reference substituting for the variable at the one predetermined fixed field in the MIB module, the referenced script defining an operation of the server 14 or other network resource 30.

Scripts may be provided by the developer of the resource and comprise choices from a menu of various defined specialized programs that may be selected by the user or network administrator, or may be very specialized and defined by the user. In step 45, the script program is defined and, in step 46, the script program is provided to the server 14, system 30, or other network resource. The script will have a name, or reference, that may be called by the script reference, when the script reference is inserted in the MIB by the user, as will be explained.

In accordance with the present invention, the user also has the option of changing the script or program having the script reference, by repeating steps 45 and 46 to supply a different script, overlaying the previous script program, or modifying the previous script program, but maintaining the same script reference.

The referenced script operation may sense a value related to the network resource, or in another aspect of the present invention, the referenced script operation may additionally comprise conducting an operation of the network resource, and the value relates to the operation of the network resource, as will be explained in more detail hereinafter.

In step 50, a second path, also depicted as lines 43 and 44, is provided to the script reference, again employing an operation within the SNMP protocol, which is the "GET" function. The conventional "GET" function addresses a desired object or variable in the MIB 28, to retrieve the value of addressed information in the MIB. In accordance with the invention, as will be explained hereinafter, a query on the second path by the network manager, activates the script operation to provide the value at the MIB. In step 52, the capability is provided to deliver the script operation value on the second path, depicted as lines 34, 35 and 36. In a specific embodiment, the MIB Subagent is made to act as a client of the server 14, so that the script is run using the name and parameters, and the results are stored in the MIB 28 and returned back to the network manager 12.

Preferably, each of the functions and capability described is conducted by a processor in accordance with computer readable program code.

Figure 5:
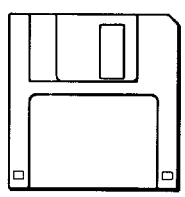
FIG. 5 is an illustration of a storage medium for storing computer executable instructions.

Referring to FIGS. 1, 2 and 5, the computer program product(s) may be supplied at I/O station 55 from a storage medium 58 which stores executable computer instructions. The illustrated example of a storage medium which is an article of manufacture is a magnetic diskette. Other suitable storage media are optical disk cartridges, magnetic tape cartridges, removable hard disk cartridges, read only memories (ROM) or programmable read only memories (PROM). The requirement for the storage media or memories is that they store digital representations of computer executable instructions. The computer program product may alternatively be supplied electronically, as from the network 10 at interface 16. The executable instructions are conventionally maintained in memory and program storage of the processor(s) of the Agent 24, Subagent 28, and/or Storage Manager 20, or other network resource.

Figure 6:
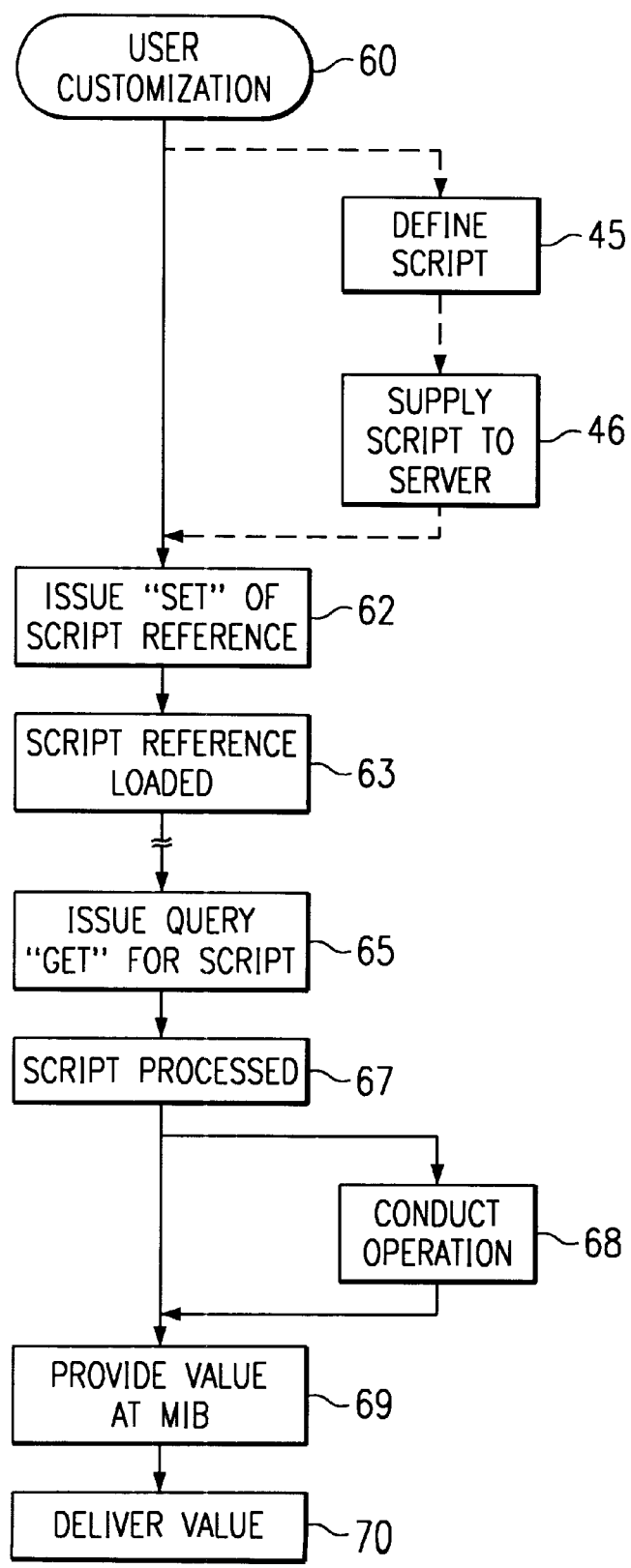
FIG. 6 is a flow chart depicting a user dynamic customization of a MIB in accordance with the present invention.

FIG. 6 illustrates use of the present invention by a user to dynamically optionally customize the standard protocol management information base (MIB) 28, beginning at step 60.

As discussed above, the user may elect to select a script from among a menu of scripts provided by the developer of the network resource 14 or 30, or may define one or more scripts in step 45 and, in step 46, supply the script to the server 14 or other network resource 30. The user may also optionally change an existing script, or may change the script name used as the script reference.

An example of a script may comprise sensing the number of sessions (the number of clients that have logged on to the server) since the last time the number of sessions was sensed. A script reference for the script may comprise "QSESS". Another example of a script may comprise requesting a parameter associated with the script, such as requesting the status of a volume stored or retrieved by a storage management server 14. The script reference may comprise "QVOL" and the associated parameter "VOL_NAME", allowing the user to provide the name of the volume when the user desires to run the script.

Another type of script allowed by the present invention is a script that can cause the server 14 or other network resource 30 to perform an operation. As an example, the script may cause the server 14 to set a maximum number of sessions allowed by the server at one time, and query the current number of sessions. The script name may comprise "LIMIT_SESS" and the parameter "MAX_N0", and the user would identify the number of sessions that were to be allowed when the user desires to run the script.

Referring to FIGS. 1 and 6, in step 62, the user, through the network manager 12, issues the standard protocol "SET" operation with the desired script reference, or name, to the address of the MIB of the desired network resource 14 or 30. If the MIB has a plurality of variables, the address will include the reference number of the variable that will be used to substitute the script reference. The path established in step 42 of FIG. 4, will cause the "SET" operation to substitute the script reference for the variable inserted in the MIB in step 41. As the result, the script reference is loaded in the MIB in step 63 of FIG. 6.

The user may run the script when desired at any time after the script reference is loaded. The user runs the script by issuing the standard protocol "GET" opration of step 65, as enabled by the present invention in step 50 of FIG. 4. The "GET" function will address the desired variable of the MIB and select the variable established in step 41 of FIG. 4, which has been replaced by the script reference and any associated parameter. The "GET" opertion may be issued by the same, or a different network manager than the network manager that issued the "SET" operation in step 62. Thus, in step 67, the server 14 or other network resource 30, will process the referenced script, or, in step 68, will additionally conduct the operation of the server or network resource in accordance with the referenced script and any associated parameter, and, in step 68, will provide the resultant value.

In accordance with the delivery process established in step 52 of FIG. 4, the results of the script are, in step 70, stored in MIB 28 and returned to the network manager 12 which issued the "GET" operation in step 65.

Those of skill in the art will recognize that the specific steps detailed in FIGS. 4 and 6 may be altered to conform to protocols other than SNMP and for network resources other than a storage management resource 14.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for dynamically changing a network protocol management information base (MIB) module of a network resource attached to a network, said protocol requiring predetermined fixed fields in said MIB module, comprising the steps of:
  inserting a variable in one of said predetermined fixed fields in said MIB module; and
  providing a first path for dynamically setting a reference to a script and any associated parameter, said script reference substituting for said variable at said one predetermined fixed field in said MIB module, said referenced script defining an operation of said network resource.

2. The method of claim 1, wherein said network additionally has an administrator, wherein said inserting step variable is addressable by said administrator, and wherein said step of providing a first path allows said administrator to address and dynamically set said script reference and any associated parameter at said predetermined fixed field in said MIB module.

3. The method of claim 2, wherein said referenced script operation senses a value related to said network resource, and additionally comprising the step of:
  providing a second path to said script reference, whereby a query on said second path activates said script operation to provide said value at said MIB.

4. The method of claim 3, additionally comprising the step of:
  providing the capability for delivering said provided value on said second path.

5. The method of claim 3, wherein said referenced script operation additionally comprises conducting an operation of said network resource and wherein said value relates to said operation of said network resource, and additionally comprising the step of:
  providing said second path to said script reference, whereby a query on said second path activates said script operation and to provide said value at said MIB.

6. The method of claim 5, additionally comprising the step of:
  delivering said provided value from said MIB module on said second path.

7. The method of claim 2, additionally comprising the step of:
  defining said script and any associated parameter, for said dynamic setting thereof at said one predetermined fixed field in said MIB module.

8. An article of manufacture comprising a computer readable medium having computer readable program code embodied therein for dynamically changing a network protocol management information base (MIB) module of a network resource attached to a network, said protocol requiring predetermined fixed fields in said MIB module, comprising:
  computer readable program code which causes a computer processor to insert a variable in one of said predetermined fixed fields in said MIB module; and
  computer readable program code which causes a computer processor to provide a first path for dynamically setting a reference to a script and any associated parameter, said script reference substituting for said variable at said one predetermined fixed field in said MIB module, said referenced script defining an operation of said network resource.

9. The article of manufacture of claim 8, wherein said network additionally has an administrator, wherein said computer readable program code which causes a computer processor to insert said variable makes said variable addressable by said administrator, and wherein said computer readable program code which causes a computer processor to provide said first path, additionally allows said administrator to address and dynamically set said script and any associated parameter at said predetermined fixed field in said MIB module.

10. The article of manufacture of claim 9, wherein said referenced script operation senses a value related to said network resource, and additionally comprising:
  computer readable program code which causes a computer processor to provide a second path to said script reference, whereby a query on said path activates said script operation to provide said value at said MIB.

11. The article of manufacture of claim 10, additionally comprising computer readable program code which causes a computer processor to deliver said provided value on said second path.

12. The article of manufacture of claim 10, wherein said referenced script operation additionally comprises conducting an operation of said network resource and wherein said value relates to said operation of said network resource, and additionally comprising computer readable program code which causes a computer processor to provide said second path to said script reference, whereby a query on said second path activates said script operation and to provide said value at said MIB.

13. The article of manufacture of claim 12, additionally comprising computer readable program code which causes a computer processor to deliver said provided value from said MIB module on said second path.

14. The article of manufacture of claim 9, additionally comprising computer readable program code which causes a computer processor to allow said script and any associated parameter to be defined, for said dynamic setting thereof at said one predetermined fixed field in said MIB module.

15. A computer program product usable with a programmable computer having computer readable program code embodied therein for dynamically changing a network protocol management information base (MIB) module of a network resource attached to a network, said protocol requiring predetermined fixed fields in said MIB module, comprising:
  computer readable program code which causes a computer p processor to insert a variable in one of said predetermined fixed fields in said MIB module; and
  computer readable program code which causes a computer processor to provide a first path for dynamically setting a reference to a script and any associated parameter, said script reference substituting for said variable at said one predetermined fixed field in said MIB module, said referenced script defining an operation of said network resource.

16. The computer program product of claim 15, wherein said network additionally has an administrator, wherein said computer readable program code which causes a computer processor to insert said variable makes said variable addressable by said administrator, and wherein said computer readable program code which causes a computer processor to provide said first path, additionally allows said administrator to address and dynamically set said script and any associated parameter at said predetermined fixed field in said MIB module.

17. The computer program product of claim 16, wherein said referenced script operation senses a value related to said network resource, and additionally comprising:

computer readable program code which causes a computer processor to provide a second path to said script reference, whereby a query on said path activates said script operation to provide said value at said MIB.

18. The computer program product of claim 17, additionally comprising computer readable program code which causes a computer processor to deliver said provided value module on said second path.

19. The computer program product of claim 17, wherein said referenced script operation additionally comprises conducting an operation of said network resource and wherein said value relates to said operation of said network resource, and additionally comprising computer readable program code which causes a computer processor to provide said second path to said script reference, whereby a query on said second path activates said script operation and to provide said value at said MIB.

20. The computer program product of claim 19, additionally comprising computer readable program code which causes a computer processor to allow said script and at least one parameter to be defined, for said dynamic setting thereof at said one predetermined fixed field in said MIB module.

21. The computer program product of claim 16, additionally comprising computer readable program code which causes a computer processor to allow said script and any associated parameter to be defined, for said dynamic setting thereof at said one predetermined fixed field in said MIB module.

22. A network resource having a network protocol management information base (MIB) module, said protocol requiring predetermined fixed fields in said MIB module, comprising:
   a variable in one of said fixed fields in said MIB module; and
   a first path to said variable for dynamically setting a reference to a script and any associated parameter, said script reference substituting for said variable at said one predetermined fixed field in said MIB module, said referenced script defining an operation of said network resource.

23. The network resource of claim 22, wherein said network additionally has an administrator, wherein said variable is addressable by said administrator, and wherein said first path allows said administrator to address and dynamically set said script reference and any associated parameter at said predetermined fixed field in said MIB module.

24. The network resource of claim 23, additionally comprising a processor, wherein said referenced script operation causes said network resource processor to sense a value related to said network resource, and additionally comprising a second path to said script reference, whereby a query on said second path activates said script operation to provide said value at said MIB.

25. The network resource of claim 24, wherein said network resource processor additionally delivers said provided value on said second path.

26. The network resource of claim 24, wherein said referenced script operation additionally comprises conducting an operation of said network resource and wherein said value relates to said operation of said network resource, and wherein a query on said second path operates said network resource processor to activate said script operation and to provide said value at said MIB.

27. The network resource of claim 24, wherein said network resource processor additionally delivers said provided value from said MIB module on said second path.

* * * * *